US012705041B2

(12) United States Patent
Suryanarayana et al.

(10) Patent No.: US 12,705,041 B2
(45) Date of Patent: Aug. 11, 2026

(54) FIRMWARE STORE FOR UPDATES IN AN INFORMATION HANDLING SYSTEM

(71) Applicant: Dell Products L.P., Round Rock, TX (US)

(72) Inventors: Shekar Babu Suryanarayana, Bangalore (IN); Xiaomei Zhu Miller, Round Rock, TX (US); Bryan James Thornley, Burnet, TX (US)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 18/213,090

(22) Filed: Jun. 22, 2023

(65) Prior Publication Data

US 2024/0427584 A1 Dec. 26, 2024

(51) Int. Cl.
*G06F 9/44* (2018.01)
*G06F 8/65* (2018.01)
*G06F 9/4401* (2018.01)

(52) U.S. Cl.
CPC .............. *G06F 8/65* (2013.01); *G06F 9/4401* (2013.01)

(58) Field of Classification Search
None
See application file for complete search history.

(56) References Cited

U.S. PATENT DOCUMENTS 8,707,297 B2 * 4/2014 Brown ...................... G06F 8/65 717/178
10,642,623 B1 * 5/2020 Righi ........................ G06F 8/65
2016/0179500 A1 * 6/2016 Hsieh ...................... G06F 8/654 713/2
2020/0310774 A1 * 10/2020 Zhu ....................... G06F 9/4401
2020/0310824 A1 * 10/2020 Atta ...................... H04L 9/3247
2020/0356357 A1 * 11/2020 Narasimhan .......... G06F 15/167
2022/0050671 A1 * 2/2022 Samuel ..................... G06F 8/65

* cited by examiner

*Primary Examiner* — Lanny N Ung
(74) *Attorney, Agent, or Firm* — Norton Rose Fulbright US LLP

(57) ABSTRACT

This disclosure describes systems and methods for performing an update or multiple updates to firmware on an information handling system in a single reboot cycle. According to some aspects of the disclosure, firmware updates may be stored in a boot partition. During reboot, an information handling system may determine whether a firmware update is present in the boot partition, and when a firmware update is present performing the update. According to some aspects of the disclosure, performing the update may include creating a firmware update hand-off block (HOB), which may correspond to the firmware update and identify where the update is stored in the boot partition.

11 Claims, 4 Drawing Sheets

FIRMWARE STORE FOR UPDATES IN AN INFORMATION HANDLING SYSTEM

FIELD OF THE DISCLOSURE

The instant disclosure relates to information handling systems. More specifically, portions of this disclosure relate to methods and systems for updating firmware on an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Aspects of this disclosure include systems and methods for organizing one or more firmware updates into capsule payloads and storing the capsule payloads in portions of a boot partition. During system boot, these capsules may be accessed using firmware update hand-off blocks and the firmware updates in the capsules executed to perform one or multiple updates in a single boot cycle.

According to one embodiment, A method may include determining, by an information handling system, whether at least one firmware update is present in a boot partition of a storage device at reboot; and, when the firmware update is present in the boot partition, executing, by the information handling system, the firmware update.

In certain embodiments, determining whether the at least one firmware update is present may include reading the boot partition without initializing queues or enabling a controller of the storage device. In certain embodiments, the boot partition may comprise a NVMe boot partition and executing the at least one firmware update may include reading the firmware update from a continuous block of data via NVMe properties. In certain embodiments, executing the at least one firmware update may include creating a firmware update hand-off block indicating a location of the at least one firmware update during pre-EFI initialization during the reboot; and passing the firmware update hand-off block from the pre-EFI initialization to a DXE foundation. In certain embodiments, the at least one firmware update may include two firmware updates. In certain embodiments, the hand-off block may include, for each of the firmware updates, an indicator of a GUID offset and a capsule payload. In certain embodiments, the at least one firmware update may include a BIOS recovery image.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

A boot partition may be a continuous section of a non-volatile memory (NVM) that can be accessed by host software on an information handling system. Boot partitions are not part of the user storage space. Because of this, a boot partition can be used by host software without setting up and formatting the disk partitions. Boot partitions provide an optional area of NVM storage that may be read by the host without the host initializing queues or enabling a controller. The simplified interface to access Boot Partitions may be used for platform initialization code (e.g., a bootloader that is executed from host ROM) to boot to a pre-OS environment (e.g., UEFI) instead of storing the image on another storage medium (e.g., SPI flash). According to aspects of this disclosure, boot partitions may store one or multiple system updates (e.g., firmware updates). In some embodiments, multiple updates are stored in a boot partition and all of the updates are executed during a single boot cycle without loss or corruption of the updates.

Figure 1:
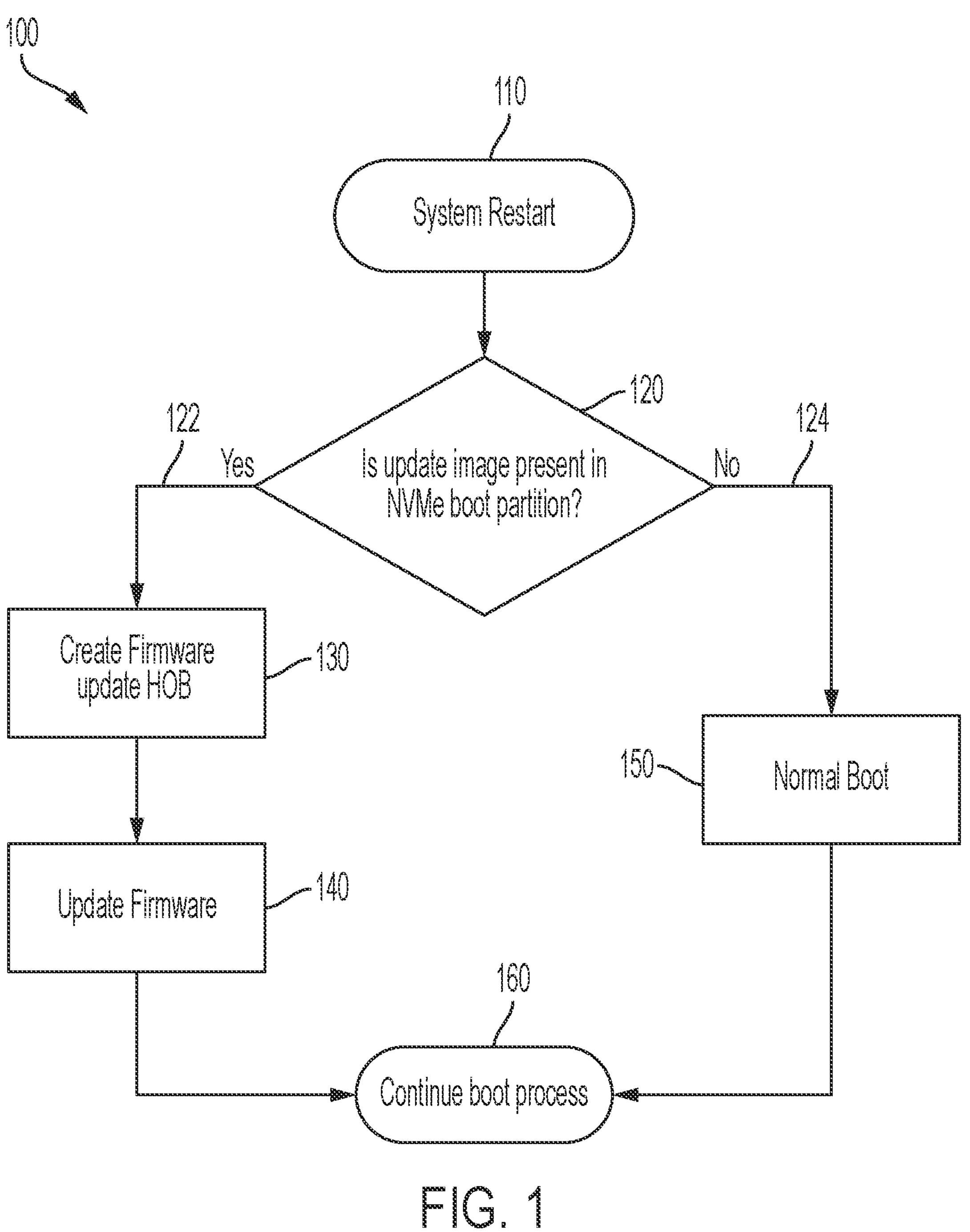
FIG. 1 depicts a flow diagram of an example method of updating firmware on an information handling system according to some embodiments of the disclosure.

Reference is now made to FIG. 1, which shows a flow diagram of an example method of updating firmware on an information handling system. In some embodiments of the disclosure, a method for performing a firmware update may include determining, by an information handling system, whether at least one firmware update is present in a boot partition of a storage device at reboot, and when the firmware update is present in the boot partition, executing, by the information handling system, the firmware update. As an example, a method may include or correspond to the update process 100 of FIG. 1. The method may include ordering a system reboot (e.g., a system restart), or may begin after a system reboot has already been ordered for the information handling system. For example, the system reboot may include or correspond to the system restart 110 of FIG. 1. At the time of the reboot, the information handling system may determine whether there is a firmware update present in a boot partition of a storage device. This determination may include or correspond to determination 120 of FIG. 1. When at least one firmware update is present in the boot partition, the information handling system may execute the update. For example, executing the update may include or correspond to branch 122 of FIG. 1, including operation 140, in which the information handling system updates the firmware. When more than one update is present in the boot partition, the system may cause all the updates to be executed. When there are not any firmware updates present in the boot partition, the system may boot as normal. For example, booting as normal may include or correspond to branch 124 in FIG. 1, including operation 150. When all firmware updates are performed, or if there were no firmware updates present in the boot partition at the time of the reboot, the information handling system continues its boot operations, which may include or correspond to operation 160.

In some implementations, determining whether the at least one firmware update is present may include reading the boot partition without initializing queues or enabling a controller of the storage device. For example, reading the boot partition may include a host allocating a Boot Partition Memory Buffer in host memory, which may be for the controller to copy contents from a Boot Partition. In such implementations, the host may initialize a Boot Partition Memory Buffer Base Address. The host may set a Boot Partition ID, Boot Partition Read Size, and Boot Partition Read Offset to initiate the Boot Partition read operation. The host may continue reading from the Boot Partition until the entire Boot Partition has been read.

To read data from a Boot Partition, the host may follow these steps:

1. Initialize the transport (e.g., PCIe link), if necessary;
2. Determine if Boot Partitions are supported by the controller (CAP.BPS);
3. Determine which Boot Partition is active (BPINFO.ABPID) and the size of the Boot Partition (BPINFO.BPSZ);
4. Allocate a physically contiguous memory buffer in the host to store the contents of a Boot Partition;
5. Initialize the address (BPMBL.BMBBA) into the memory buffer where the contents should be copied;
6. Initiate the transfer of data from a Boot Partition by writing to the Boot Partition Read Select (BPRSEL) property. This may include setting the Boot Partition identifier (BPRSEL.BPID), size of Boot Partition Read Size (BPRSEL.BPRSZ) and Boot Partition Read Offset (BPRSEL.BPROF). The controller may set the Boot Read Status (BPINFO.BRS) field while transferring the Boot Partition contents to indicate a Boot Partition read operation is in progress; and
7. Wait for the controller to completely transfer the requested portion of the Boot Partition, indicated in the status field (BPINFO.BRS). If BPINFO.BRS is set to 10b, the requested Boot Partition data has been transferred to the Boot Partition Memory Buffer. If BPINFO.BRS is set to 11b, there was an error transferring the requested Boot Partition data and the host may request the Boot Partition data again.

In some implementations having constrained memory environments, the host may read the contents of a Boot Partition with a small Boot Partition Memory Buffer by reading a small portion of a Boot Partition, moving the data out of the Boot Memory Buffer to another memory location, and then reading another portion of the Boot Partition until the entire Boot Partition has been read. Alternatively or additionally, in some implementations, if the Boot Partition log page is supported then the Boot Partition can be accessed through the Boot Partition log page.

After step 7 of the Boot Partition read operation, the information handling system may access the firmware updates and begin applying the firmware updates to components of the information handling system. In some implementations, the boot partition comprises a NVMe boot partition and executing the at least one firmware update comprises reading the firmware update from a continuous block of data via NVMe properties. For example, the boot partition may be configured as an NVMe Boot partition according to the NVM Express Base Specification, revision 2.0a, which is hereby incorporated by reference in its entirety.

In some implementations, executing the at least one firmware update may include creating a firmware update hand-off block (HOB) indicating a location of the at least one firmware update during pre-EFI initialization during the reboot and passing the firmware update HOB from the pre-EFI initialization to a DXE foundation. For example, creating a firmware update hand-off block may include or correspond to operation 130 in FIG. 1. The HOB may be configured according to the UEFI Platform Initialization Specification, v. 1.8, which is hereby incorporated by reference in its entirety.

A hand-off block (HOB) is a basic container of data storage, allocated as a continuous block in a section of memory, and made available to executable content in a HOB producer phase (e.g., a PEI phase). Multiple HOBs may be stored sequentially in memory. A sequential list of HOBs, referred to as a HOB list, may be kept to determine the contents and relative positions of all the HOBs in a given sequential section in memory. For UEFI HOB lists, only HOB producer phase components can make additions or changes to HOBs. Once the HOB list is passed into the HOB consumer phase (e.g., a DXE phase), it may be read, such as to identify locations of firmware update packages to execute.

Figure 2:
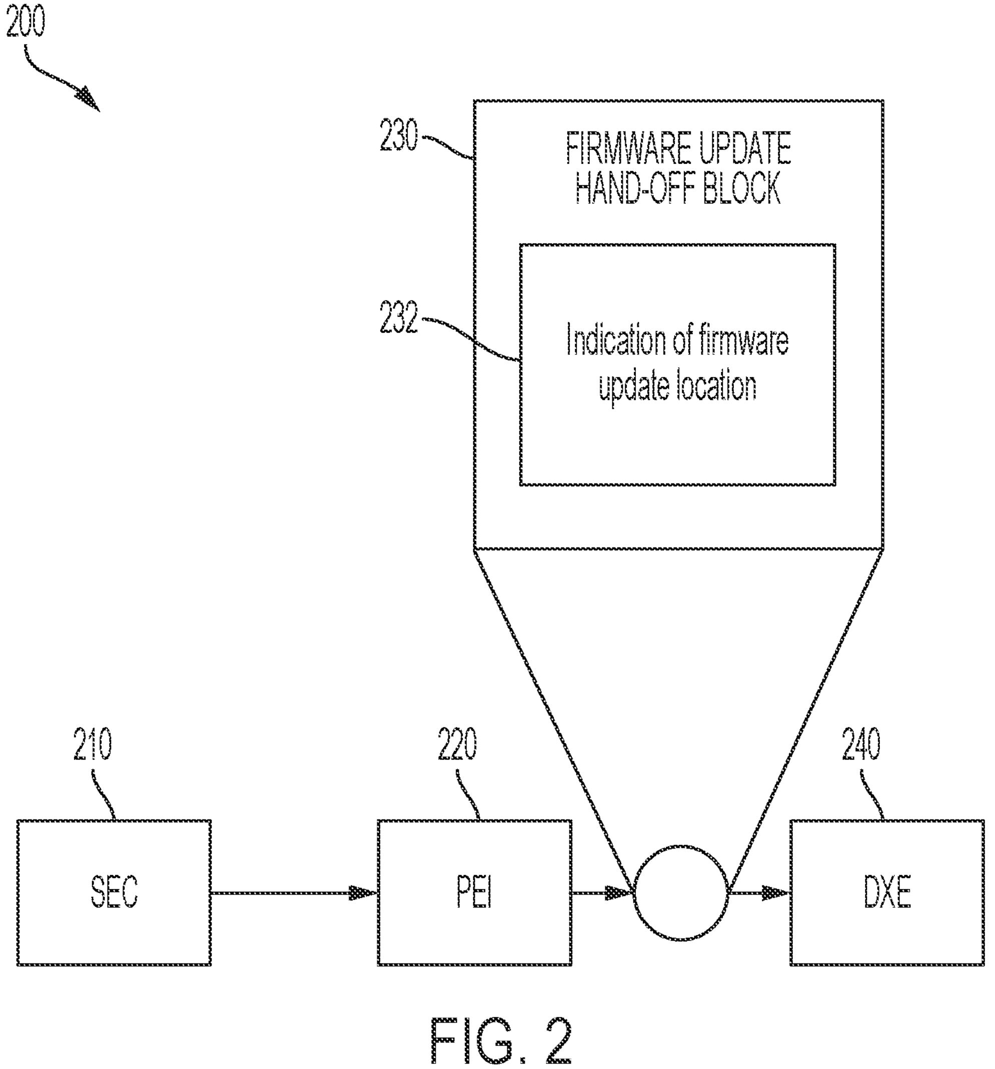
FIG. 2 depicts a schematic block diagram of a boot phase sequence for an information handling system according to some embodiments of the disclosure.

Creating a firmware update hand-off block may be better understood with reference to FIG. 2, which depicts a schematic block diagram of a boot phase sequence 200. Boot phase sequence 200 (e.g., a UEFI boot process) for an information handling system may include a SEC phase 210, a PEI phase 220, and a DXE phase 230. Boot phase sequence 200 may also include the creation and handling of a firmware update hand-off block 240. SEC phase 210 is a security phase, and may include CPU initialization code. The SEC phase 210 may be configured to handle system restarts, and/or set up other portions of the system, for example, such that the PEI phase 220 may be found, validated, installed, and/or run. In some implementations, the SEC phase 210 may create hand-off information and pass that hand-off information to the PEI Foundation.

The PEI phase 220 of FIG. 2 is a Pre-EFI Initialization phase which may configure other components of the information handling system and/or retrieve and boot the DXE phase 230. PEI phase 220 may include operations configured to initialize a persistent memory (e.g., NVM), describe the memory in hand-off blocks (HOBs), describe the firmware volume locations in HOBs, and pass control into the Driver Execution Environment (DXE) phase. For example, PEI phase 220 may create firmware update hand-off block 230 and pass the hand-off block 230, (e.g., the information contained in the hand-off block) to the DXE phase 240. The information in the firmware update hand-off block may include an indication of a firmware update location, such as indication 232. For example, the indication of a firmware update location may include an address in a block of memory corresponding to a firmware update. Alternatively or additionally, the indication of a firmware update location may include information corresponding to a continuous block of memory, information corresponding to an offset from the start of the continuous block of memory, and/or information regarding the size of a firmware update. DXE phase 230 may then execute the firmware update. For example, the DXE phase 230 may perform operation 140 of FIG. 1 in order to execute the firmware update.

Figure 3:
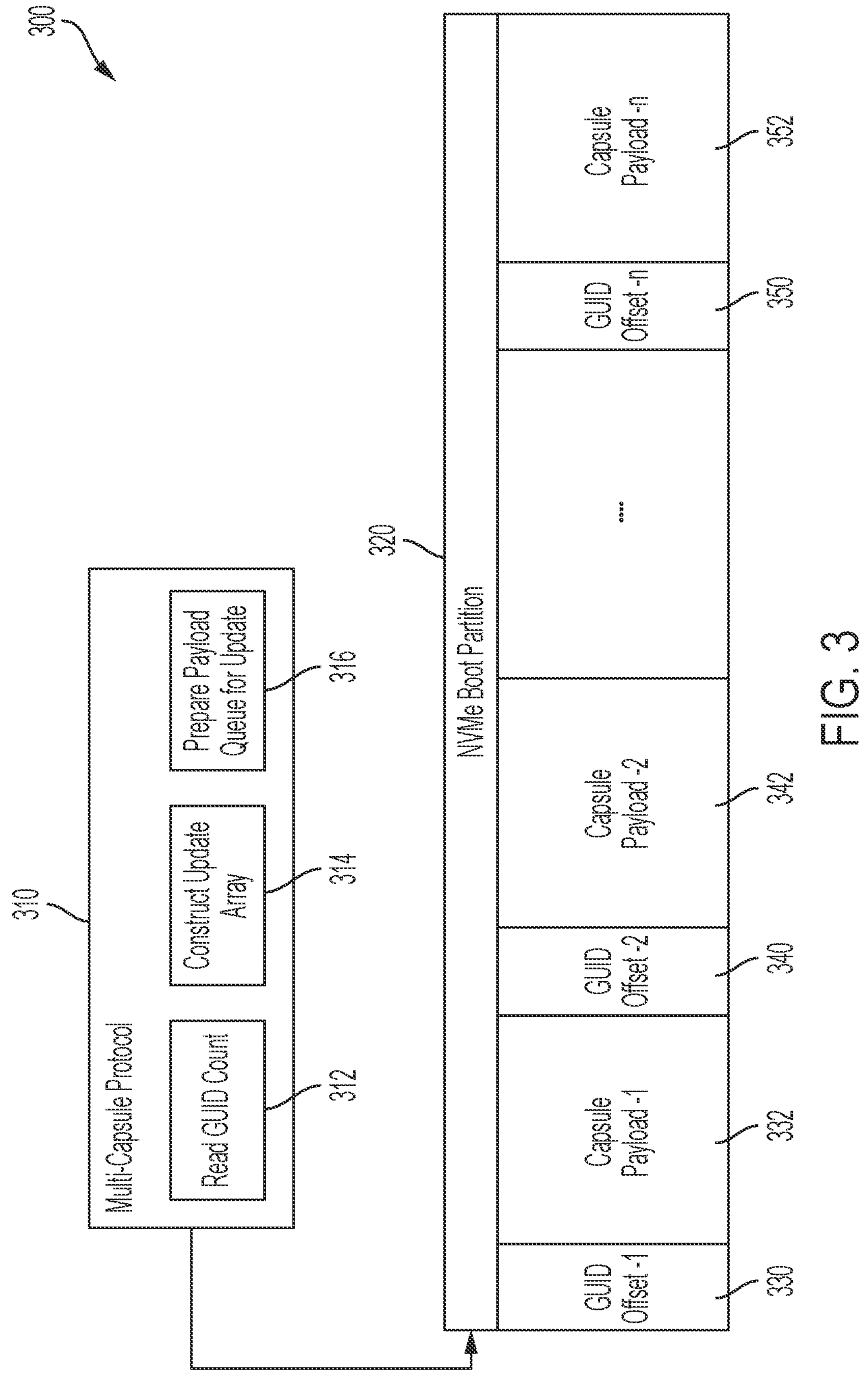
FIG. 3 depicts a schematic block diagram of an example of storing update capsules in a boot partition according to some embodiments of the disclosure.

According to some aspects of the present disclosure, at least one firmware update may be stored on the boot partition. In some implementations, the at least one firmware update may further include two or more firmware updates. The at least one firmware update(s) may be stored in the boot partition via a multi-capsule protocol. For example, FIG. 3 shows a schematic block diagram of an example of storing update capsule payloads in a boot partition. In this example, the multi capsule protocol 310 may store updates in the boot partition. The multi-capsule protocol may include functional modules such as module 312 which reads a GUID count, module 314 which constructs an update array, and module 316, which prepares a payload queue for update. When the multi-capsule protocol has prepared its payload queues with the capsule payloads (e.g., an array of updates to be executed), it will store the capsule payloads sequentially in the boot partition 320. Capsule payloads need not necessarily be made up solely of firmware updates to devices on the information handling system. In some implementations, the at least one firmware update may include a BIOS recovery image. Once stored in the boot partition 320, the updates can be ordered based on globally unique identifier (GUID) offsets. These offsets can identify the start of a capsule payload and can be recorded for the reading and retrieval of the capsule payloads as discussed above. For example, a first capsule payload 332, which may contain a first update, may be stored in the boot partition 320 starting at a first GUID offset 330. A second capsule payload 342 may be placed sequentially after first capsule payload 332, at second GUID offset 340. For each capsule payload prepared by the multi-capsule protocol, the capsule payloads may be stored in a similar, sequential manner in the boot partition 320 until the nth capsule payload 352 is stored at an nth GUID offset 350 in the boot partition 320. Although the example depicted in FIG. 3 shows the capsule payloads as being roughly equal in size, a person of ordinary skill in the art would readily understand that the capsule payloads and the corresponding spacing between offsets need not necessarily be equal in size.

Returning to the Firmware update hand-off block 230 in FIG. 2, the hand-off block 230 may include an indication of the locations of firmware updates in the boot partition. In some aspects of the present disclosure in which there are two or more firmware updates, the hand-off block may include, for each of the two or more firmware updates, an indicator of each GUID offset for the various capsule payloads. The indicator of a GUID offset for each of the two or more updates may be included, for example, inside or as part of the indication 232. Alternatively, an indicator of a GUID offset may be separate from the indication of firmware update location. a GUID offset of a capsule payload as stored in the boot partition (e.g., the GUID offset corresponding to the respective firmware update(s)).

According to aspects of this disclosure, NVMe Boot Partitions, which provide an optional area of NVM storage that may be read by the host without the host initializing queues or enabling the controller, are used to load firmware or other updates that should be applied to the information handling system prior to the initialization of the operation system. An NVMe Boot Partition provides a beneficial location for the storage of these updates because the large storage size of the NVMe device provides storage space for large firmware updates and/or multiple firmware updates.

Additionally, access techniques for the NVMe Boot Partition allows the firmware updates to be accessed prior to passing control to the operating system. The simplified interface to access Boot Partitions may be used for platform initialization code (e.g., a boot loader that is executed from host ROM) to boot to a pre-OS environment (e.g., UEFI) instead of storing the image on another storage medium (e.g., SPIflash).

These example embodiments describe and illustrate various techniques for updating components, such updating firmware of components, of an information handling system. For example, the techniques described above and illustrated in FIG. 1, FIG. 2, and/or FIG. 3 may be performed in an information handling system such as that shown and described with reference to FIG. 4. For example, the techniques may be applied to perform a firmware update of a touch-based user input device 450, a graphics device 430, a network interface controller 440, and/or a BMC 480 in a single boot cycle.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 4.

Figure 4:
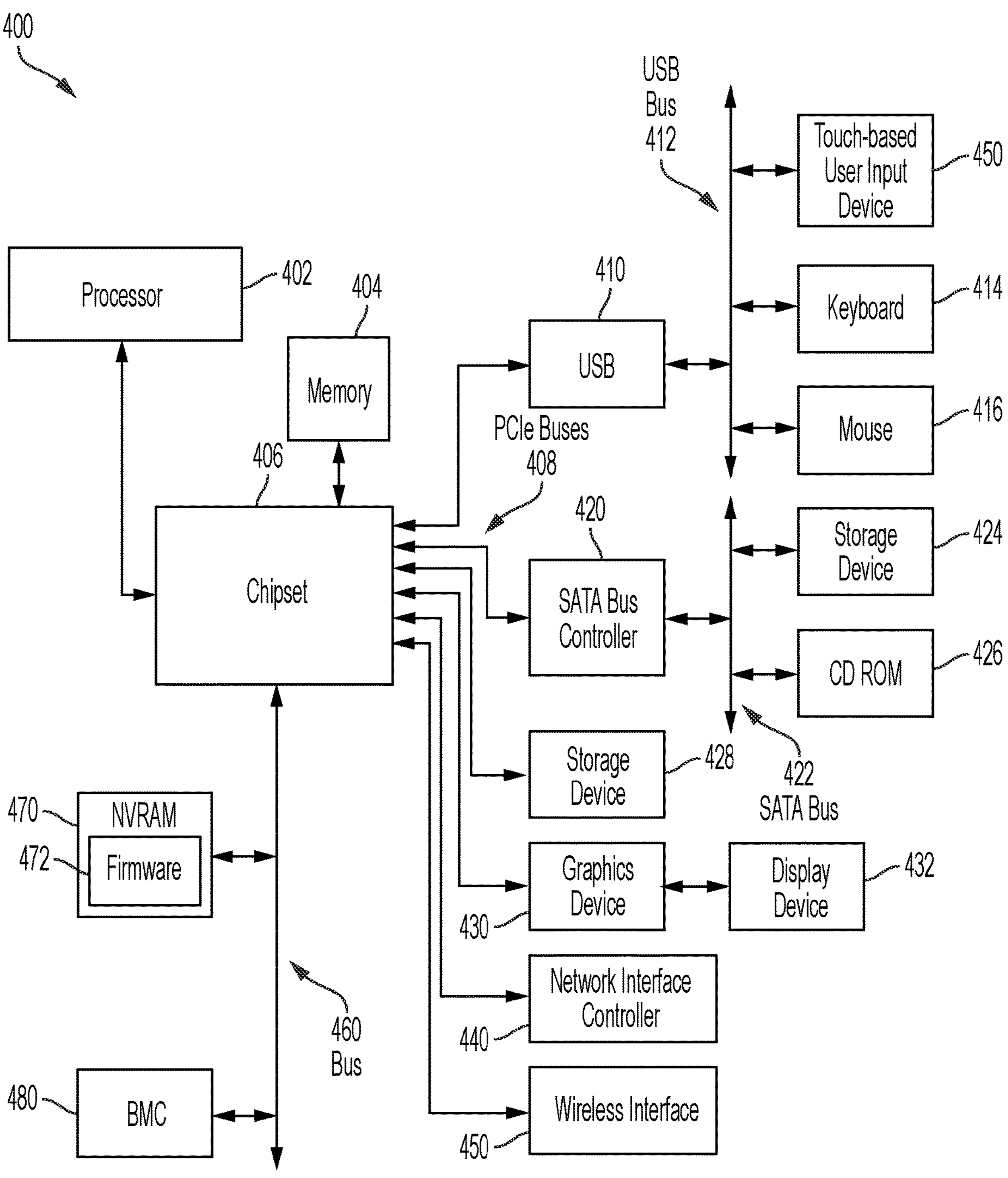
FIG. 4 is a schematic block diagram of an example information handling system according to some embodiments of the disclosure.

FIG. 4 illustrates an example information handling system 400. Information handling system 400 may include a processor 402 (e.g., a central processing unit (CPU)), a memory (e.g., a dynamic random-access memory (DRAM)) 404, and a chipset 406. In some embodiments, one or more of the processor 402, the memory 404, and the chipset 406 may be included on a motherboard (also referred to as a mainboard), which is a printed circuit board (PCB) with embedded conductors organized as transmission lines between the processor 402, the memory 404, the chipset 406, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 402, the memory 404, the chipset 406, and/or other components may be organized as a System on Chip (SoC).

The processor 402 may execute program code by accessing instructions loaded into memory 404 from a storage device, executing the instructions to operate on data also loaded into memory 404 from a storage device, and generate output data that is stored back into memory 404 or sent to another component. The processor 402 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 402 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 406 may facilitate the transfer of data between the processor 402, the memory 404, and other components. In some embodiments, chipset 406 may include two or more integrated circuits (ICs), such as a northbridge controller coupled to the processor 402, the memory 404, and a southbridge controller, with the southbridge controller coupled to the other components such as USB 410, SATA 420, and PCIe buses 408. The chipset 406 may couple to other components through one or more PCIe buses 408.

Some components may be coupled to one bus line of the PCIe buses 408, whereas some components may be coupled to more than one bus line of the PCIe buses 408. One example component is a universal serial bus (USB) controller 410, which interfaces the chipset 406 to a USB bus 412. A USB bus 412 may couple input/output components such as a keyboard 414 and a mouse 416, but also other components such as USB flash drives, or another information handling system. Another example component is a SATA bus controller 420, which couples the chipset 406 to a SATA bus 422. The SATA bus 422 may facilitate efficient transfer of data between the chipset 406 and components coupled to the chipset 406 and a storage device 424 (e.g., a hard disk drive (HDD) or solid-state disk drive (SDD)) and/or a compact disc read-only memory (CD-ROM) 426. The PCIe bus 408 may also couple the chipset 406 directly to a storage device 428 (e.g., a solid-state disk drive (SDD)). A further example of an example component is a graphics device 430 (e.g., a graphics processing unit (GPU)) for generating output to a display device 432, a network interface controller (NIC) 440, and/or a wireless interface 450 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 406 may also be coupled to a serial peripheral interface (SPI) and/or Inter-Integrated Circuit (I2C) bus 460, which couples the chipset 406 to system management components. For example, a non-volatile random-access memory (NVRAM) 470 for storing firmware 472 may be coupled to the bus 460. As another example, a controller, such as a baseboard management controller (BMC) 480, may be coupled to the chipset 406 through the bus 460. BMC 480 may be referred to as a service processor or embedded controller (EC). Capabilities and functions provided by BMC 480 may vary considerably based on the type of information handling system. For example, the term baseboard management system may be used to describe an embedded processor included at a server, while an embedded controller may be found in a consumer-level device. As disclosed herein, BMC 480 represents a processing device different from processor 402, which provides various management functions for information handling system 400. For example, an embedded controller may be responsible for power management, cooling management, and the like. An embedded controller included at a data storage system may be referred to as a storage enclosure processor or a chassis processor.

System 400 may include additional processors that are configured to provide localized or specific control functions, such as a battery management controller. Bus 460 can include one or more busses, including a Serial Peripheral Interface (SPI) bus, an Inter-Integrated Circuit (I2C) bus, a system management bus (SMBUS), a power management bus (PMBUS), or the like. BMC 480 may be configured to provide out-of-band access to devices at information handling system 400. Out-of-band access in the context of the bus 460 may refer to operations performed prior to execution of firmware 472 by processor 402 to initialize operation of system 400.

Firmware 472 may include instructions executable by processor 102 to initialize and test the hardware components of system 400. For example, the instructions may cause the processor 402 to execute a power-on self-test (POST). The instructions may further cause the processor 402 to load a boot loader or an operating system (OS) from a mass storage device. Firmware 472 additionally may provide an abstraction layer for the hardware, such as a consistent way for application programs and operating systems to interact with the keyboard, display, and other input/output devices. When power is first applied to information handling system 400, the system may begin a sequence of initialization procedures, such as a boot procedure or a secure boot procedure. During the initialization sequence, also referred to as a boot sequence, components of system 400 may be configured and enabled for operation and device drivers may be installed. Device drivers may provide an interface through which other components of the system 400 can communicate with a corresponding device. The firmware 472 may include a basic input-output system (BIOS) and/or include a unified extensible firmware interface (UEFI). Firmware 472 may also include one or more firmware modules of the information handling system. Additionally, configuration settings for the firmware 472 and firmware of the information handling system 400 may be stored in the NVRAM 470. NVRAM 470 may, for example, be a non-volatile firmware memory of the information handling system 400 and may store a firmware memory map namespace 400 of the information handling system. NVRAM 470 may further store one or more container-specific firmware memory map namespaces for one or more containers concurrently executed by the information handling system.

Information handling system 400 may include additional components and additional busses, not shown for clarity. For example, system 400 may include multiple processor cores (either within processor 402 or separately coupled to the chipset 406 or through the PCIe buses 408), audio devices (such as may be coupled to the chipset 406 through one of the PCIe busses 408), or the like. While a particular arrangement of bus technologies and interconnections is illustrated for the purpose of example, one of skill will appreciate that the techniques disclosed herein are applicable to other system architectures. System 400 may include multiple processors and/or redundant bus controllers. In some embodiments, one or more components may be integrated together in an integrated circuit (IC), which is circuitry built on a common substrate. For example, portions of chipset 406 can be integrated within processor 402. Additional components of information handling system 400 may include one or more storage devices that may store machine-executable code, one or more communications ports for communicating with external devices, and various input and output (I/O) devices, such as a keyboard, a mouse, and a video display.

In some embodiments, processor 402 may include multiple processors, such as multiple processing cores for parallel processing by the information handling system 400. For example, the information handling system 400 may include a server comprising multiple processors for parallel processing. In some embodiments, the information handling system 400 may support virtual machine (VM) operation, with multiple virtualized instances of one or more operating systems executed in parallel by the information handling system 400. For example, resources, such as processors or processing cores of the information handling system may be assigned to multiple containerized instances of one or more operating systems of the information handling system 400 executed in parallel. A container may, for example, be a virtual machine executed by the information handling system 400 for execution of an instance of an operating system by the information handling system 400. Thus, for example, multiple users may remotely connect to the information handling system 400, such as in a cloud computing configuration, to utilize resources of the information handling system 400, such as memory, processors, and other hardware, firmware, and software capabilities of the information handling system 400. Parallel execution of multiple containers by the information handling system 400 may allow the information handling system 400 to execute tasks for multiple users in parallel secure virtual environments.

The schematic flow chart diagram of FIG. 1 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Certain elements of embodiments described in this specification have been labeled as modules: for example, modules 312, 314, and 316 of FIG. 3. A module may include a component of that information handling system suitably programmed to operate according to executable instructions. For example, a module may be implemented as a hardware circuit comprising custom VLSI circuits or gate arrays, semiconductor chips comprising logic circuitry, transistors, or other discrete components. A module may also be implemented in programmable hardware devices such as field programmable gate arrays, programmable array logic, programmable logic devices, a controller, or the like.

Modules may also include software-defined units or instructions that, when executed by a component of an information handling system, retrieve and transform data stored on a data storage device from a first state to a second state. An identified module of executable code may, for example, comprise one or more physical blocks of computer instructions which may be organized as an object, procedure, or function. The executables of an identified module need not be physically located together, but may comprise disparate instructions stored in different locations which, when joined logically together, comprise the module, and when executed by the processor, achieve the stated data transformation.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

determining, by an information handling system, at least two firmware updates are present in a boot partition of a storage device at reboot;

executing, by the information handling system, the at least two firmware updates present in the boot partition, wherein executing the at least two firmware updates comprises:

creating a firmware update hand-off block indicating a memory location of the at least two firmware updates during pre-EFI initialization during the reboot, wherein the firmware update hand-off block comprises, for each of the at least two firmware updates, an indicator of a globally unique identifier (GUID) offset and a capsule payload such that a second capsule payload is arranged sequentially after a first capsule payload at a second GUID offset;

and passing the firmware update hand-off block (HOB) from the pre-EFI initialization to a driver execution environment (DXE) foundation.

2. The method of claim 1, wherein determining the at least two firmware updates are present in the boot partition comprises reading the boot partition without initializing queues or enabling a controller of the storage device.

3. The method of claim 2, wherein the boot partition comprises a non-volatile memory express (NVMe) boot partition and executing the at least two firmware updates comprises reading the at least two firmware updates from a continuous block of data via NVMe properties.

4. The method of claim 1, wherein the at least two firmware updates comprises a basic input output system (BIOS) recovery image.

5. An information handling system, comprising:

a memory;

a processor coupled to the memory, wherein the processor is configured to perform steps comprising:

determining, by an information handling system, whether at least is two firmware updates are present in a boot partition of a storage device at reboot;

when the at least two firmware updates are present in the boot partition, executing, by the information handling system, the at least two firmware updates, wherein executing the at least two firmware updates comprises:

creating a firmware update hand-off block indicating a memory location of the at least two firmware updates during pre-EFI initialization during the reboot, wherein the hand-off block comprises, for each of the at least two firmware updates, an indicator of a globally unique identifier (GUID) offset and a capsule payload such that a second capsule payload is arranged sequentially after a first capsule payload at a second GUID offset; and passing the firmware update hand-off block (HOB) from the pre-EFI initialization to a driver execution environment (DXE) foundation.

6. The information handling system of claim 5, wherein determining whether the at least two firmware updates are present comprises reading the boot partition without initializing queues or enabling a controller of the storage device.

7. The information handling system of claim 6, wherein the boot partition comprises a non-volatile memory express (NVMe) boot partition and executing the at least two firmware updates comprises reading the at least two firmware updates from a continuous block of data via NVMe properties.

8. The information handling system of claim 5, wherein the at least two firmware updates comprises a basic input output system (BIOS) recovery image.

9. A computer program product, comprising:

a non-transitory computer readable medium comprising code for performing steps comprising:

determining, by an information handling system, whether at least two firmware updates are present in a boot partition of a storage device at reboot;

when the at least two firmware updates are present in the boot partition, executing, by the information handling system, the at least two firmware updates, wherein executing the at least two firmware updates comprises; and creating a firmware update hand-off block indicating a memory location of the at least two firmware updates during pre-EFI initialization during the reboot, wherein the hand-off block comprises, for each of the at least two firmware updates, an indicator of a globally unique identifier (GUID) offset and a capsule payload such that a second capsule payload is arranged sequentially after a first capsule payload at a second GUID offset;

passing the firmware update hand-off block (HOB) from the pre-EFI initialization to a driver execution environment (DXE) foundation.

10. The computer program product of claim 9, wherein determining whether the at least two firmware updates are present comprises reading the boot partition without initializing queues or enabling a controller of the storage device.

11. The computer program product of claim 10, wherein the boot partition comprises non-volatile memory express (NVMe) boot partition and executing the at least two firmware updates comprises reading the at least two firmware updates from a continuous block of data via NVMe properties.

* * * * *